May 10, 1932.  A. F. KUESTER  1,857,758

TRAILER

Filed March 26, 1931

INVENTOR:
AUGUST F. KUESTER.
BY
Louis A. Maxson.

ATT'Y.

Patented May 10, 1932

1,857,758

UNITED STATES PATENT OFFICE

AUGUST F. KUESTER, OF CLINTONVILLE, WISCONSIN

TRAILER

Application filed March 26, 1931. Serial No. 525,461.

This invention relates to trailers and more particularly to improvements in trailers of the underslung or low bed type.

One of the objects of this invention is the provision of an improved trailer. Another object of the invention is the provision of an improved trailer having an improved axle mounting. A further object of this invention is to provide an improved trailer having an improved spring axle mounting. Yet another object of this invention is to provide an improved spring axle mounting having associated therewith improved buffer means, whereby movement of the trailer body in one direction may be controlled. A still further object of this invention is the provision of an improved construction in what is generally known as an underslung or low bed trailer, wherein the body is suspended below the supporting axles and is mounted to provide yielding movement on the part of the body when the body supporting wheels are passing over uneven ground surfaces so that a minimum amount of the shock and jar will be transmitted to the body of the trailer.

With the above and other objects in view, the invention consists in the novel features of construction, the combination and arrangement of parts as hereinafter more fully set forth and more particularly pointed out in the appended claims.

In the accompanying drawings there is shown for purposes of illustration one form which the invention may assume in practice.

In these drawings,—

In this illustrative construction, 1 indicates the body or load receiving platform of the trailer supported through the improved spring axle mounting generally designated 2 by supporting wheels 3. Connected in a suitable manner to the forward end of the trailer body or platform is a draw bar 4 adapted for connection to any suitable form of haulage means.

Figure 1:
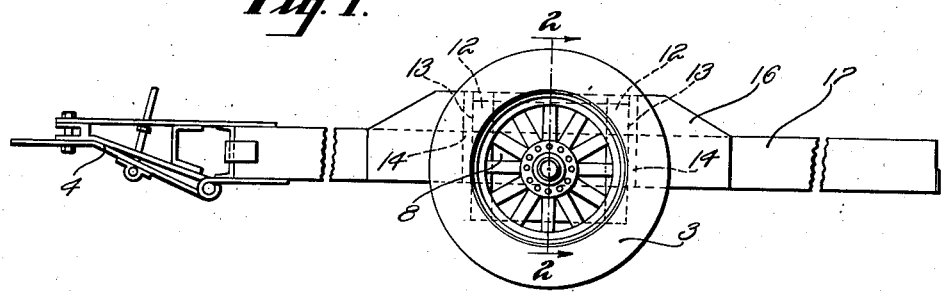
Fig. 1 is a side elevational view of the illustrative form of the improved trailer.
Figure 2:
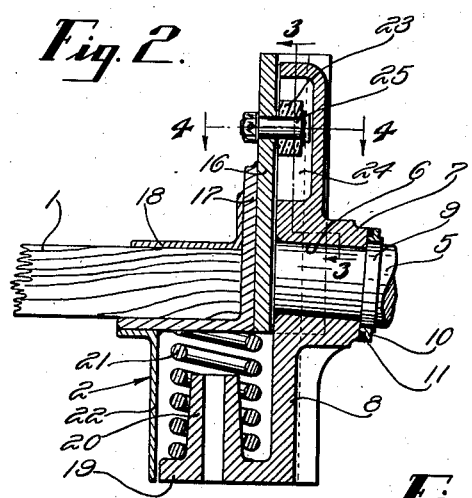
Fig. 2 is a transverse vertical sectional view taken substantially on line 2—2 of Fig. 1.
Figure 3:
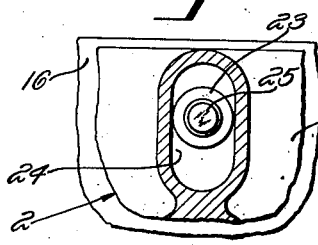
Fig. 3 is a detail vertical sectional view taken substantially on line 3—3 of Fig. 2; and, Fig. 4 is a detail horizontal sectional view taken substantially on line 4—4 of Fig. 2.
Figure 4:
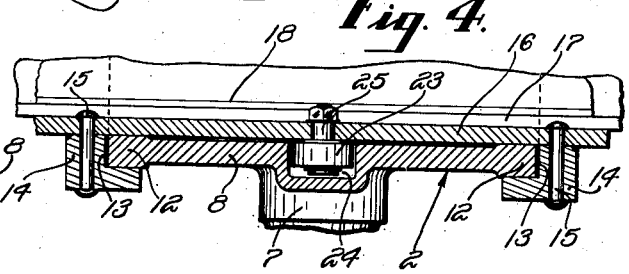

In the present constructin the body supporting wheels 3 are mounted upon suitable stub axles 5, suitably secured, herein pressed, within bores 6 formed in the projecting hubs 7 of vertical slides 8 herein guided in an improved manner at the opposite sides of the trailer body. Each stub axle has formed thereon a collar 9 disposed in contiguity with the outer face of the hub 7, as clearly shown in Fig. 2, and surrounding this collar is a suitable retaining ring 10 carrying a felt ring 11 suitably pressed against the outer face of the hub 7, and the parts 10 and 11 herein cooperate to form a seal for the axle bearing (not shown), to prevent leakage of lubricant and access of dirt or other foreign substances to the bearing. As illustrated, each vertical slide 8 is provided with lateral guides 12 slidably mounted within parallel vertical guideways 13 formed as by angle members 14, secured by rivets 15 or otherwise to a vertical plate 16. The plate 16 is secured in a suitable manner as by welding or otherwise to the vertical flange of an angle iron 17 at one side of the trailer platform, the horizontal flange of this angle iron underlying and supporting the bed of the trailer platform. Also secured in a suitable manner to the angle iron 17 and the platform bed is an angular brace member 18 for maintaining the platform bed in position on the angle iron 17. Each vertical slide 8 in this instance is provided with an inwardly extending lateral portion 19, as shown in Fig. 2, having formed thereon a plurality of upstanding boss-like guides 20 for positioning a plurality of coiled springs 21 interposed between the lateral projection 19 and the bottom of the trailer platform. Secured to the angle iron 17 on the lower surface thereof is a casing 22 forming a suitable housing for the coiled springs 21.

There is also provided improved means for controlling movement of the trailer platform in an upward direction relative to its spring mounting, which herein comprises an annular rubber buffer 23 operating in a vertical guideway 24 formed in the inner side of the vertical slide 8, and this buffer is freely rotatably mounted on a bolt or other suitable member 25 carried by the vertical plate 16 secured to the trailer platform. If desired the parts may be rearranged so that the buffer 23 is carried by the slide 8 and the cooperating guideway 24 is formed on the vertical plate 16.

It will be apparent from the foregoing that when a heavy load is placed on the body of the trailer the springs 21 will have a tendency to become compressed, but as the springs are of sufficient strength to normally support the body of the trailer with a comparatively light weight load thereon, the springs will absorb any shock or jar which might be transmitted to the body of the trailer. When the body supporting wheels are passing over an uneven ground surface, due to the fact that when the wheels rise upwardly to pass over an obstruction, the springs 21 will become compressed due to the load on the trailer body, and when the wheels drop downwardly on the other side of the obstruction, reexpansion of the springs 21 will prevent jar from being transmitted in any appreciable amount to the trailer body. Movement of the trailer body in an upward direction relative to its yieldable mounting is controlled by the rubber buffers 23 moving in the guideways 24 formed in the vertical slides 8 by which the body supporting wheels are carried. Movement of the trailer body in a downward direction is limited by the upper surfaces of the upstanding boss-like projections 20 engaging the bottom surfaces of the angle irons 17 of the trailer platform. It will be evident that the casing 22 housing the coiled springs 21 prevents access of dirt or other foreign substances to the springs to thereby hinder the proper action thereof. It will also be understood that the improved construction described above is provided at each side of the trailer platform, and that any number of springs and buffers may be employed; although, in the present construction it has been found that three springs and one buffer at each side of the trailer platform suffice under ordinary conditions. These and other advantages of the improved trailer will be clearly apparent to those skilled in this art.

While there is in this application specifically described one form which this invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A trailer including supporting wheels, supporting axles therefor, depending brackets carried by the axles, a load receiving body yieldably mounted upon the depending brackets whereby said body is movable relative to the supporting wheels, and buffer means for controlling movement of the trailer body relative to its yieldable mounting in one direction, and including rubber buffers acting between said brackets and body.

2. A trailer including supporting wheels, supporting axles therefor, brackets depending upon said axles and having laterally disposed lower portions, a load receiving body positioned between the wheels and above said lateral portions, yieldable members positioned between the body and the lateral portions for yieldably mounting the body relative to the supporting wheels, and shock absorbing means interposed between said body and the supporting wheels for controlling movement of the body in one direction relative to its yieldable mounting.

3. A trailer including supporting wheels, supporting axles therefor, vertical slides carrying said axles, a load receiving body, a spring mounting for said body between said body and said vertical slides, vertical plates secured to said body and presenting guideways for receiving said vertical slides, and buffer means interposed between said slides and said vertical plates for controlling movement in one direction of the body relative to its spring mounting, said buffer means including rubber buffers operating in vertical guideways in the vertical slides and supported by members attached to said vertical plates.

4. A trailer including supporting wheels, supporting axles for said wheels, slides to which said axles are secured, a load receiving body, guideways on said body receiving said slides, yieldable spring mountings for the body between said slides and the body, and casings attached to said body and housing said spring mountings, said slides having lateral projections supporting said spring mountings, and each of said casings being shaped to surround said lateral projections while permitting free yielding movement of said mountings.

5. In a vehicle mounting, a supporting wheel, a load receiving body, spaced vertical guides carried by the body, a slide mounted in the vertical guides having a lateral portion underlying the body, a spring mounting between the body and the lateral portion, a stub axle connected with the slide receiving the wheel, the slide having a vertical guideway in vertical alinement with the stub axle, and buffer means carried by the body received in said vertical ways.

In testimony whereof I affix my signature.

AUGUST F. KUESTER.